United States Patent [19]
Schirmer

[11] Patent Number: 5,482,769
[45] Date of Patent: Jan. 9, 1996

[54] CROSS-LINKED FILM

[75] Inventor: Henry G. Schirmer, Spartanburg, S.C.

[73] Assignee: W. R. Grace & Co.-Conn., Duncan, S.C.

[21] Appl. No.: 252,300

[22] Filed: Jun. 1, 1994

[51] Int. Cl.$^6$ .................................................. B32B 27/08
[52] U.S. Cl. ........................ 428/335; 428/516; 428/517; 428/520; 428/699
[58] Field of Search .................................. 428/516, 517, 428/520, 335, 699

[56] References Cited

U.S. PATENT DOCUMENTS

| | | | |
|---|---|---|---|
| 3,456,044 | 7/1969 | Pahlke | 264/25 |
| 3,555,604 | 1/1971 | Pahlke | 18/14 |
| 4,258,166 | 3/1981 | Canterino | 526/348 |
| 4,355,076 | 10/1982 | Gash | 428/411 |
| 4,440,824 | 4/1984 | Bonis | 428/216 |
| 4,461,792 | 7/1984 | Anthony | 428/35 |
| 4,464,439 | 8/1984 | Castelein | 428/517 |
| 4,879,177 | 11/1989 | Boice | 428/339 |
| 5,211,875 | 5/1993 | Speer et al. | 252/188 |
| 5,219,666 | 6/1993 | Schirmer | 428/521 |

FOREIGN PATENT DOCUMENTS 507207  10/1992  European Pat. Off. .

Primary Examiner—P. C. Sluby
Attorney, Agent, or Firm—Mark B. Quatt

[57] ABSTRACT

A cross-linkable, preferably stretch oriented film comprising a blend of a polyolefin and a diene polymer and a transition metal catalyst, wherein the blend cross-links in the presence of oxygen without irradiation to provide a film with high heat resistance.

10 Claims, 1 Drawing Sheet

CROSS-LINKED FILM

BACKGROUND OF THE INVENTION

The present invention pertains to compositions for making packaging film, and more particularly to a thin polymeric film suitable for replacing polyvinyl chloride film especially in packaging applications.

Polyvinyl chloride (PVC) has long been used in many applications in the packaging art. One particularly widespread application for PVC is the use of such material as an overwrap material for trayed retail cuts of meat and other food products in a retail environment such as a supermarket.

PVC has several desirable properties for this use. For example, it has excellent burn-through resistance, optics and good elasticity and stretch properties at use temperatures.

Unfortunately, PVC also has several disadvantages, including the production of hydrogen chloride gas during heat sealing and the generally corrosive effects of such gases in the packaging room. Extractables from the PVC into the packaged food product have also become of concern.

It would be of great benefit to the packaging industry, and particular to applications requiring an instore film for overwrapping trayed food products, to provide a film with many of the advantages of PVC but without the disadvantages described above.

In addition to the foregoing, it is desirable to provide a film as aforesaid without the disadvantages of PVC, and to provide such a film which is cross-linked without irradiation. In the applications described above the film material is wrapped around the product and sealed as on a hot plate. Without cross-linking the film might burn through on the hot plate and therefore cross-linking is desirable to provide high heat resistance. Irradiation is customarily used to provide cross-linking, but this procedure is inconvenient, expensive and inefficient and also difficult to perform on very thin films.

It is also desirable to provide such a film which is stretch oriented to provide improved properties. Processes for producing oriented films and oriented films themselves are known in the art.

U.S. Patent No. 3,456,044 (Pahlke) mentions thin films of thicknesses less than 1 mil such as 0.5 mils, and discloses a double bubble method for biaxially orienting thermoplastic films, including the steps of producing a primary tubing which is inflated by introducing air into the interior thereof, and a cooling ring 22, as well as squeeze rolls 34 and 28, with rolls 34 having a greater speed than rolls 28. Between the two pairs of squeeze rolls is a reinflated secondary bubble. If annealing is desired, the tubing can be reinflated to form a bubble 70.

U.S. Pat. No. 3,555,604 (Pahlke) is a patent based on a divisional application which was derived from the same priority application as the '044 patent described above, and discloses the same information described above for the '044 patent.

U.S. Pat. No. 4,258,166 (Canterino et al.) discloses a uniaxially oriented plastic film material with improved strength and clarity in the direction of orientation preferably comprising homopolymers and copolymers of ethylene.

U.S. Pat. No. 4,355,076 (Gash) discloses monoaxially oriented polypropylene film laminated to a monoaxially oriented high density polyethylene film, the films produced by for example tubular blowing.

U.S. Pat. No. 4,440,824 (Bonis) discloses a thermoformable coextruded multilayer structure useful for thermoforming into containers, the structure having polyolefin coextruded with a high impact polystyrene layer. A five layer structure is shown.

U.S. Pat. No. 4,464,439 (Castelein) discloses a coextruded laminate having a sheet of polypropylene and a sheet of a mixture of high impact polystyrene, crystalline polypropylene, and styrene/dienic monomer block copolymer.

U.S. Pat. No. 4,879,177 (Boice) discloses a monoaxially oriented shrink film having a core layer of butadiene styrene copolymer, outer layers of ethylene propylene copolymer, and intermediate bonding layers of ethylene copolymer.

U.S. Pat. No. 5,219,666 (Schirmer et al.) discloses polymeric, oriented films made by the use of a combination of a hot blown process and a blown bubble process.

It is an object of the present invention to provide a cross-linked, stretch oriented film which can be included in a thermoplastic film useful as an overwrap material for trayed retail cuts of meat and other food products in a supermarket or other retail environments.

It is a further object of the present invention to provide a film as aforesaid that can be cross-linked without irradiation.

It is a still further object of the present invention to provide a film as aforesaid which has good burn-through resistance.

It is an additional object of the present invention to provide such a film with other desirable characteristics, such as good optical properties.

Further objects and advantages of the present invention will appear hereinbelow.

SUMMARY OF THE INVENTION

The inventor has discovered that a blend of a polyolefin, a diene polymer and a transition metal catalyst cross-links in the presence of oxygen. This provides a film with heat resistance, especially burn-through resistance. The film of the present invention is a cross-linked, stretch-oriented film with heat resistance and good optical properties.

The film can desirably be provided as a laminate with an outer sealable layer and preferably with an intermediate adhesive layer.

The final laminate may have a thickness of from 0.5–5 mils, and desirably may be used as a thin laminate in thicknesses from 0.5–2 mils.

BRIEF DESCRIPTION OF THE DRAWING

The present invention may be further understood by reference to the accompanying FIGURE:

which is a schematic cross-section of a preferred embodiment of a multi-layered film in accordance with the present invention.

DESCRIPTION OF THE PREFERRED EMBODIMENTS

Figure 1:
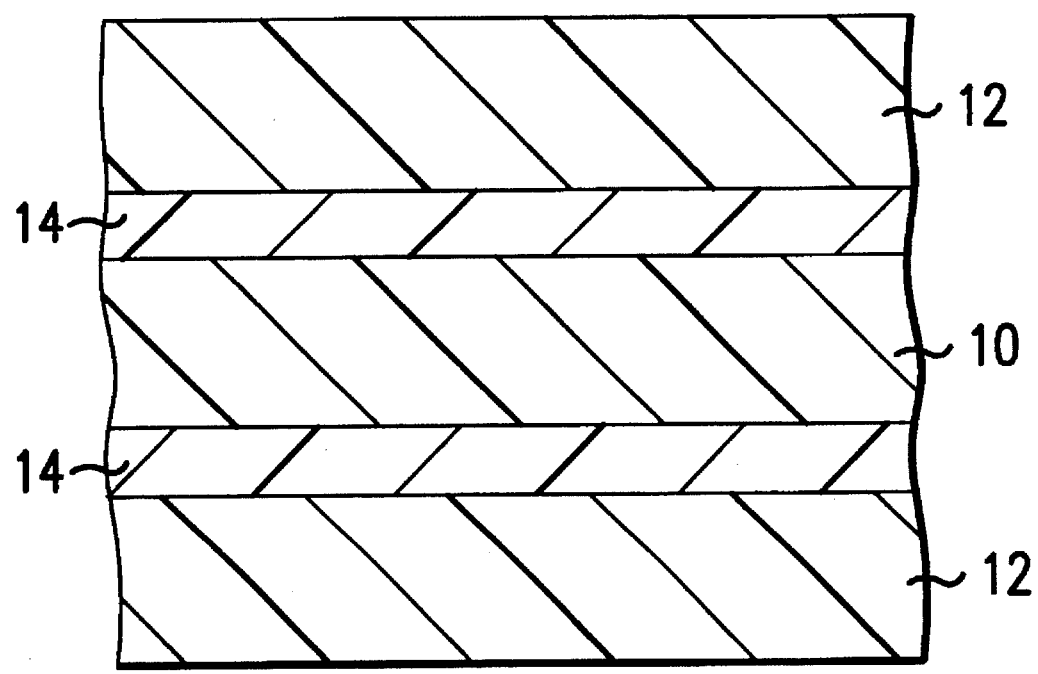

The cross-linked, stretch-oriented film of the present invention offers considerable advantages. It is cross-linked without irradiation and obtains high heat resistance. Further, it is stretch-oriented to achieve desirable properties and may readily be formed into an advantageous laminate.

The polyolefin is preferably VLDPE (very low density polyethylene) or LLDPE (linear, low density polyethylene), although others can readily be used, as polypropylene and copolymers of ethylene and propylene. Homogeneous ethylene alpha olefin copolymers can also be used in connection with this invention.

The diene polymer blended with the polyolefin provides unsaturated groups. Typical diene polymers include octadienes, hexadienes, 1,4-polybutadiene, 1,2-polybutadiene, non-conjugated dienes and heptadienes.

Preferably, the transition metal catalyst is in the form of a salt, with the metal thereof selected from the first, second or third transition series of the Periodic Table. Suitable metals include, but are not limited to, manganese II or III, iron II or III, cobalt II or III, nickel II or III, copper I or II, rhodium II, III or IV, and ruthenium. The oxidation state of the metal when introduced is not necessarily that of the active form. The metal is preferably iron, nickel or copper, more preferably manganese and most preferably cobalt. Suitable counterions for the metal include, but are not limited to, chloride, acetate, stearate, palmitate, 2-ethylhexanoate, neodecanoate or naphthenate. Particularly preferable salts include cobalt (II) 2-ethylhexanoate and cobalt (II) neodecanoate. The metal salt may also be an ionomer, in which case a polymeric counterion is employed. Such ionomers are well known in the art.

In accordance with the present invention, it has been found that a blend of a polyolefin and a diene polymer cross-links in the presence of oxygen.

The blend is preferably stretch oriented before cross-linking. For example, the blend is coextruded through a die in the conventional manner and the extruded film hot blown to form a blown bubble. In accordance with standard processing, an air cooling ring may be positioned circumferentially around the blown bubble to cool same as it exits the die. The blown bubble is melt oriented in both the machine and transverse directions using various blow up ratios, but preferably the bubble is hot blown to a blow-up ratio of between 1.5 and 8. If desired, one may immediately reinflate the bubble after cooling into a secondary bubble and then expand same to impart orientation of the material in primarily the transverse direction, primarily the longitudinal direction, or in both the transverse and longitudinal directions. The bubble is collapsed in a set of pinch rolls and transferred to a take-up roll. This procedure is shown, for example, in U.S. Pat. No. 5,219,666, which is incorporated herein by reference in its entirety. Naturally, alternate methods may be utilized for providing the stretch oriented film.

The cross-linkable, stretch oriented film of the present invention may be desirably formed into a multi-layer laminate. In a preferred construction, outer layers 12 as shown in FIG. 1 may comprise a polyolefin or desirably an ethylene polymer or copolymer such as ethylene vinyl acetate copolymer (EVA). One may also desirably use styrenic polymers and copolymers, for example, styrene butadiene copolymer, such as that commercially available from Phillips under the designation KR-10 having a butadiene content of 25% by weight of the copolymer, or KK-36 (for fatty food contact). Desirably, styrene butadiene copolymers (SBC) are used for the outer layers, especially block copolymers containing a major portion (greater than 50%) of styrene and a minor portion (less than 50%) of butadiene comonomer. These materials provide an optimum balance of stiffness and flexibility to the film.

Core layer 10 preferably comprises the blend of the present invention, i.e. a blend of a polyolefin and a diene polymer, and a transition metal catalyst. More than one polyolefin can be used in the blend, as well as more than one diene polymer. The term "polymer" includes herein not only homopolymers, but copolymers and terpolymers as well provided they blend with the other components to provide a cross-linkable blend.

In the embodiment shown in the drawing, the outer layers 12 are bonded to the core layer 10 by means of intermediate layers 14 comprising, for example, a polymeric adhesive and preferably a copolymer of ethylene, and more preferably an ethylene vinyl acetate copolymer (EVA). Other polymeric materials, including chemically modified adhesives, can be used for layers 14 provided that they process adequately in processes such as those discussed herein. Blends of polymeric materials and polymeric adhesives may also be used for intermediate layers.

For layers of the present invention which contain SBC, anti-fog/plasticizing agents, such as Atmer 645 (a trademark of ICI), a proprietary antifog/plasticizer and/or Atmer 1010 (a trademark of ICI), a glycerol ester liquid are preferably included, desirably in amounts between about 0.5 and 10% by weight of the layer or layers. The intermediate layers 14 of the present invention also desirably may contain such agents in the aforesaid amounts. The multi-layer film of the present invention is preferably prepared by coextrusion techniques as discussed hereinabove.

The present invention will be more readily understood from a consideration of the following illustrative examples.

Three sample rolls of film were produced, by the process described in U.S. Pat. No. 5,219,666.

The construction of each of these three films was as follows:

| | |
|---|---|
| Example 1 | SBC/EVA/BLEND 1/EVA/SBC |
| Example 2 | SBC/EVA/BLEND 2/EVA/SBC |
| Example 3 (Comparative) | SBC/EVA/VLDPE/EVA/SBC |

In the examples, "SBC" is a styrene butadiene copolymer available from Phillips under the designation KK36-2. The SBC materials of the skin layers included about 2% each, by weight of the layer, of ATMER 1010 (a trademark of ICI), a glycerol ester liquid and ATMER 645 (a trade mark of ICI), a proprietary antifog/plasticizer; both Atmer materials are used as antifog agents, and are available from ICI.

"EVA" is an ethylene vinyl acetate copolymer, and in the examples produced in accordance with the invention, the EVA actually comprised a blend of 50% (by weight) of an EVA resin, and 50% (by weight) of an EVA master batch. The EVA resin was Elvax 3165 available from DuPont. This resin has a vinyl acetate content of about 18% by weight. The EVA master batch comprised 92%, by weight of the master batch, of Elvax 3165, and 4% each, by weight of the master batch, of ATMER 1010 (a trademark of ICI), a glycerol ester liquid and ATMER 645 (a trademark of ICI), a roprietary antifog/plasticizer.

The BLEND 1 of Example 1 was made up of:

72% by weight of a VLDPE (DEFD 1015-8 available from Union Carbide) which has a density of about 0.900 and a melt index of about 0.1;

20% by weight of the blend layer of RB830, a 1,2-polybutadiene available from JSR; and 8% by weight of an LLDPE master batch, i.e. a blend of 40% by weight of a linear low density polyethylene, and 30% each, by weight, of ATMER 1010 and ATMER 645 (a trademark of ICI), a proprietary anti-fog/plasticizer, the LLDPE master batch provided commercially under the designation Santec 23-222.

The BLEND 2 of Example 2 was like BLEND 1, but also included 5%, by weight of the blend, of cobalt decanoate master batch, wherein a cobalt decanoate material was compounded with EVA resin. In the cobalt decanoate master batch, EVA (9% VA) comprises 97.7% of the master batch, and the cobalt decanoate comprised 2.3% of the master batch.

The core layer 10 of Example 3 contained very low density polyethylene, the DEFD 1015 material available from Union Carbide. Samples of a stretch olefin film made in accordance with the method disclosed in U.S. Pat. No. 5,219,666, were produced to determine if cross-linking would occur by an oxidation reaction. These samples were analyzed for percent gel in general accord with standard ASTM procedure for determining gel content and inferentially the degree of cross-linking of the film. All samples were extracted in boiling toluene, vacuum dried and re-weighed. The samples were extracted a second 21 hours to assure complete solubility of all soluble portions. The results were as follows:

|  | Example 1 | Example 2 | Example 3 |
|---|---|---|---|
| Gel % (ASTM D-2765-84) | 0 | 14.7 | 0 |

The cross-linkable material of the invention, as illustrated in Example 2, is very useful in producing a heat resistant material useful in overwrap applications such as those described above.

This invention may be embodied in other forms or carried out in other ways without departing from the spirit or essential characteristics thereof. The present embodiment is therefore to be considered as in all respects illustrative and not restrictive, the scope of the invention being indicated by the appended claims, and all changes which come within the meaning and range of equivalency are intended to be embraced therein.

What is claimed is:

1. A cross-linkable film comprising
   a) two outer layers comprising a polyolefin or a styrene polymer or copolymer; and
   b) a layer intermediate the outer layers comprising a blend of a polyolefin, a diene polymer and a transition metal catalyst, wherein the film cross-links in the presence of oxygen.

2. A film according to claim 1 including an outer heat sealable layer.

3. A film according to claim 2 wherein the outer sealable layer is a styrene butadiene copolymer.

4. A film according to claim 2 including an intermediate polymeric adhesive.

5. A film according to claim 4 wherein the blend comprises polyethylene, polybutadiene and cobalt decanoate.

6. A film according to claim 4 having a thickness of 0.5–2 mils.

7. A cross-linkable, oriented film comprising:
   a) a core layer comprising a blend of a polyolefin, a diene polymer, and a transition metal catalyst;
   b) two outer layers comprising a styrene polymer or copolymer; and
   c) two intermediate layers, bonding the core layer to respective outer layers, comprising a polymeric adhesive.

8. The film of claim 7 wherein the core layer comprises a blend of an ethylene alpha olefin copolymer, a diene polymer, and a transition metal catalyst.

9. A cross-linkable film of claim 7 wherein the outer layers each comprise a styrene butadiene copolymer.

10. The cross-linkable film of claim 7 wherein the intermediate layers comprise an anhydride grafted polymer.

\* \* \* \* \*